United States Patent
Okuyama et al.

(10) Patent No.: US 8,237,888 B2
(45) Date of Patent: Aug. 7, 2012

(54) ILLUMINATING DEVICE, DISPLAY DEVICE, AND METHOD OF MANUFACTURING LIGHT MODULATION ELEMENT

(75) Inventors: Kentaro Okuyama, Miyagi (JP); Mamoru Mizuno, Miyagi (JP); Harumi Sato, Miyagi (JP); Tomoaki Suzuki, Miyagi (JP); Tomomi Suzuki, Fukushima (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 12/572,688

(22) Filed: Oct. 2, 2009

(65) Prior Publication Data

US 2010/0085510 A1 Apr. 8, 2010

(30) Foreign Application Priority Data

Oct. 7, 2008 (JP) ................................. 2008-260604

(51) Int. Cl.
*G02F 1/1335* (2006.01)
*G09F 13/04* (2006.01)

(52) U.S. Cl. ............ 349/65; 349/30; 349/139; 349/123; 362/97.1; 362/97.2; 362/606

(58) Field of Classification Search .................... 349/65, 349/187, 147, 144, 139, 61, 58, 56, 123, 349/127, 128, 191, 30; 362/97.1, 606, 97.2, 362/97.3
See application file for complete search history.

(56) References Cited

U.S. PATENT DOCUMENTS

| | | | |
|---|---|---|---|
| 6,331,881 B1 * | 12/2001 | Hatano et al. | 349/86 |
| 2001/0046009 A1 * | 11/2001 | Hatano et al. | 349/86 |
| 2010/0171903 A1 * | 7/2010 | Okuyama | 349/65 |
| 2011/0242146 A1 * | 10/2011 | Uchida et al. | 345/690 |
| 2011/0249221 A1 * | 10/2011 | Uchida et al. | 349/65 |

FOREIGN PATENT DOCUMENTS

| | | |
|---|---|---|
| JP | 06-347790 | 12/1994 |
| JP | 3479493 | 10/2003 |

* cited by examiner

*Primary Examiner* — Brian Healy
(74) *Attorney, Agent, or Firm* — K&L Gates LLP

(57) ABSTRACT

An illuminating device includes a light guide plate, a light source disposed on a side face of the light guide plate, and a light modulation element disposed on a surface or on inside of the light guide plate and joined to the light guide plate. The light modulation element has a pair of transparent substrates disposed apart from each other and opposed to each other, a pair of electrodes provided on surfaces of the pair of transparent substrates, and a light modulation layer provided in a gap between the pair of transparent substrates. The light modulation layer includes a first region and a second region both having optical anisotropy and having response speeds to an electric field different from each other.

14 Claims, 10 Drawing Sheets

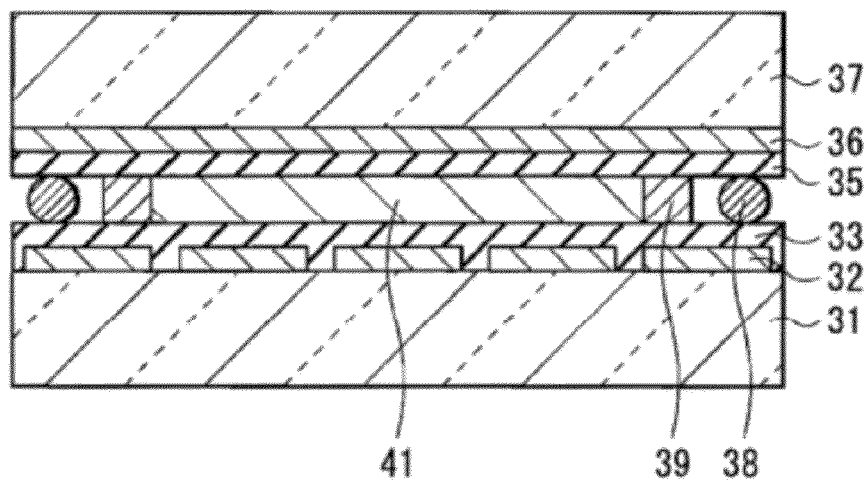
FIG. 9A
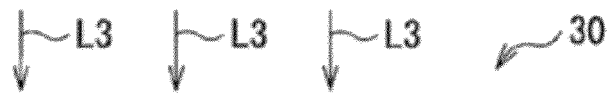
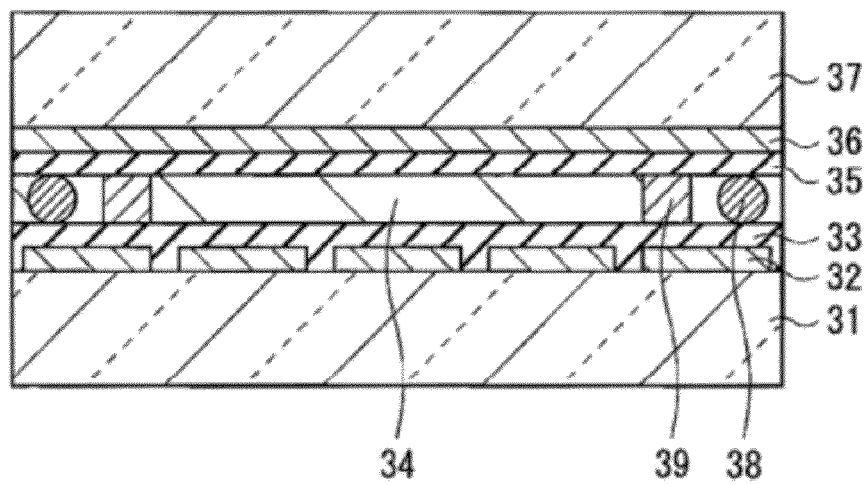
FIG. 9B
FIG. 9C

COMPARATIVE EXAMPLE 1 (FRONT)

COMPARATIVE EXAMPLE 2 (OBLIQUE)

EXAMPLE 1 (FRONT)

EXAMPLE 2 (OBLIQUE)

ILLUMINATING DEVICE, DISPLAY DEVICE, AND METHOD OF MANUFACTURING LIGHT MODULATION ELEMENT

CROSS REFERENCES TO RELATED APPLICATIONS

The present application claims priority to Japanese Priority Patent Application JP 2008-260604 filed in the Japan Patent Office on Oct. 7, 2008, the entire content of which is hereby incorporated by reference.

BACKGROUND

The present application relates to an illuminating device having a light modulation element expressing scattering property or transparency to light, a display device, and a method of manufacturing the light modulation element.

In recent years, improvement in picture quality and energy saving of a liquid crystal display are progressing rapidly, and a method that realizes improvement in dark-place contrast by partially modulating intensity of light of a backlight has been proposed. Such a method mainly drives light emitting diodes (LEDs) used as a light source of the backlight partially to modulate light of the backlight in accordance with a display image. Also, for a large-sized liquid crystal display, demand for reduction in thickness is increasing as in a small-sized liquid crystal display. Accordingly, an edge light method that disposes a light source at an edge of a light guide plate is attracting attention, rather than a method of disposing a cold cathode fluorescent lamp (CCFL) or the LED immediately below a liquid crystal panel. In the edge light method, however, it is difficult to perform the partial driving that partially modulates the light intensity of the light source.

SUMMARY

As a technique of extracting the light propagating in a light guide plate, for example, Japanese Unexamined Patent Application Publication No. H06-347790 proposes a display device which uses a polymer-dispersed liquid crystal (PDLC) for performing switching between a transparent state and a scattering state. This technique aims to prevent reflection and the like, and partially applies a voltage to the PDLC to perform the switching between the transparent state and the scattering state. In this method, however, when the PDLC is in the transparent state in a front direction (a direction normal to the PDLC), a part of light obliquely propagating in the light guide plate is scattered due to a difference in refractive index between a liquid crystal material and a polymer material. Consequently, light leaks in a range where a view angle is large, and thus a view angle characteristic deteriorates. In order to improve the view angle characteristic, for example, Japanese Patent Registration No. 3479493 proposes to absorb the light leaked in an oblique direction by a polarizer.

In such a method, however, since the light leaked in the oblique direction is absorbed by the polarizer, there is a problem that display becomes dark.

It is therefore desirable to provide an illuminating device, a display device, and a method of manufacturing a light modulation element capable of reducing leakage of light in a range where a view angle is large while improving display luminance.

A first illuminating device according to an embodiment includes: a light guide plate; a light source disposed on a side face of the light guide plate; and a light modulation element disposed on a surface or on inside of the light guide plate and joined to the light guide plate. The light modulation element has: a pair of transparent substrates disposed apart from each other and opposed to each other; a pair of electrodes provided on surfaces of the pair of transparent substrates; and a light modulation layer provided in a gap between the pair of transparent substrates. The light modulation layer includes a first region and a second region both having optical anisotropy and having response speeds to an electric field different from each other.

A display device according to an embodiment includes a display panel having a plurality of pixels disposed in a matrix, which are driven based on an image signal; and the above-described illuminating device illuminating the display panel.

In the first illuminating device and the display device according to an embodiment, the light modulation layer including the first region and the second region is provided in the light modulation element joined to the light guide plate. The first region and the second region have the optical anisotropy and their response speeds to the electric field are different from each other. Thereby, orientations of the optical axes of the first and the second regions can be made coincide with each other or made different from each other by controlling the electric field. Therefore, a difference in refractive index is decreased in all directions including a front direction and an oblique direction and thus high transparency is obtained, for example, when an ordinary light refractive index of the first region and an ordinary light refractive index of the second region are made close to each other, an extraordinary light refractive index of the first region and an extraordinary light refractive index of the second region are made close to each other, and also the orientation of the optical axis of the first region and the orientation of the optical axis of the second region are made coincide with each other by the electric field control. Also, there is hardly any refractive index difference in all of the directions including the front direction and oblique direction and thus even higher transparency is obtained, for example, when the ordinary light refractive index of the first region and that of the second region are made equal to each other, the extraordinary light refractive index of the first region and that of the second region are made equal to each other, and also the orientation of the optical axis of the first region and that of the second region are made coincide with each other by the electric field control.

A second illuminating device according to an embodiment includes a light guide plate; a light source disposed on a side face of the light guide plate; and a light modulation element disposed on a surface or on inside of the light guide plate and joined to the light guide plate. The light modulation element has: a pair of transparent substrates disposed apart from each other and opposed to each other; a pair of electrodes provided on surfaces of the pair of transparent substrates; and a light modulation layer provided in a gap between the pair of transparent substrates. The light modulation layer includes a plurality of regions having response speeds to an electric field different from each other, expresses a scattering property to light from the light source when a voltage is applied to the pair of electrodes, and expresses transparency to the light from the light source when the voltage is not applied to the pair of electrodes.

In the second illuminating device according to an embodiment, the plurality of regions having the response speeds to the electric field different from each other are provided in the light modulation layer joined to the light guide plate. Also, the light modulation layer expresses the scattering property to the light from the light source when the voltage is applied to the pair of electrodes, and expresses the transparency to the light from the light source when the voltage is not applied to the pair of electrodes. The light modulation layer becomes transparent to the light from the light source by the electric field control, since orientations of optical axes of the plurality of regions coincide with each other and since there is a small or hardly any difference in refractive index in all directions including a front direction and an oblique direction, for example.

A method of manufacturing a light modulation element according to an embodiment includes the steps of: disposing two transparent substrates on a surface of each of which an electrode and an orientation film are formed in order so that the orientation films face each other; overlaying the two transparent substrates while sandwiching a composite layer in which a liquid crystal material and a material having an orientation property and a polymerization property are combined; and polymerizing the material having the orientation property and the polymerization property with heat or light or by both.

In the method of manufacturing the light modulation element according to an embodiment, the material having the orientation property and the polymerization property included in the composite layer sandwiched by the two transparent substrates is polymerized with at least one of heat and light. Thereby, the polymerized material expresses an optical anisotropy in an orientation which coincides with an orientation of an optical axis of the liquid crystal material. Also, a length in a direction of an optical axis of the polymerized material is larger than a direction in the optical axis of the liquid crystal material, so that a response speed to an electric field in a region including the polymerized material becomes lower than a response speed in a region including the liquid crystal material. As a result, the orientation of the optical axis of the region including the polymerized material and that of the optical axis of the region including the liquid crystal material can be made coincide with each other or made different from each other by the electric field control. Therefore, as in the cases described above, the difference in refractive index can be made small or eliminated in all of the directions including the front direction and the oblique direction, and thus the high transparency can be obtained.

According to the first illuminating device and the display device of an embodiment, the first region and the second region having the optical anisotropy and whose response speeds to the electric field are different from each other are provided in the light modulation element joined to the light guide plate. Accordingly, the difference in refractive index can be made small or eliminated in all of the directions including the front direction and the oblique direction, and thus high transparency can be obtained. Thereby, leakage of light in a range where a view angle is large can be reduced or almost eliminated in a dark state. Also, luminance in a part in a partially-light state can be increased by an amount in which the leakage of the light has decreased. Therefore, according to an embodiment, it is possible to reduce or almost eliminate the leakage of the light in the range where the view angle is large while improving the display luminance.

According to the second illuminating device of an embodiment, the plurality of regions having the response speeds to the electric field different from each other are provided in the light modulation layer joined to the light guide plate. The light modulation layer expresses the scattering property to the light from the light source when the voltage is applied to the pair of electrodes, and expresses the transparency to the light from the light source when the voltage is not applied to the pair of electrodes. Accordingly, the difference in refractive index can be made small or eliminated in all of the directions including the front direction and the oblique direction, and thus high transparency can be obtained. Thereby, the leakage of the light in the range where the view angle is large can be reduced or almost eliminated in the dark state. Also, the luminance in the part in the partially-light state can be increased by the amount in which the leakage of the light has decreased. Therefore, according to an embodiment, it is possible to reduce or almost eliminate the leakage of the light in the range where the view angle is large while improving the display luminance.

According to the method of manufacturing the light modulation element of an embodiment, the material having the orientation property and the polymerization property included in the composite layer sandwiched by the two transparent substrates is polymerized with at least one of heat and light. Accordingly, the difference in refractive index can be made small or eliminated in all of the directions including the front direction and the oblique direction, and thus high transparency can be obtained. Thereby, the leakage of the light in the range where the view angle is large can be reduced or almost eliminated in the dark state. Also, the luminance in the part in the partially-light state can be increased by the amount in which the leakage of the light has decreased. Therefore, according to an embodiment, it is possible to reduce or almost eliminate the leakage of the light in the range where the view angle is large while improving the display luminance.

Additional features and advantages are described herein, and will be apparent from the following Detailed Description and the figures.

BRIEF DESCRIPTION OF THE FIGURES

FIGS. 9A to 9C are cross sections for explaining the manufacturing processes subsequent to FIG. 8C.

DETAILED DESCRIPTION

An embodiment will be described in detail hereinbelow with reference to the drawings. The description will be made in the following order.

1. Embodiment (backlight)
2. Modification (backlight, position of light modulating element, and addition of optical sheet)
3. Application example (display device)

Figure 1:
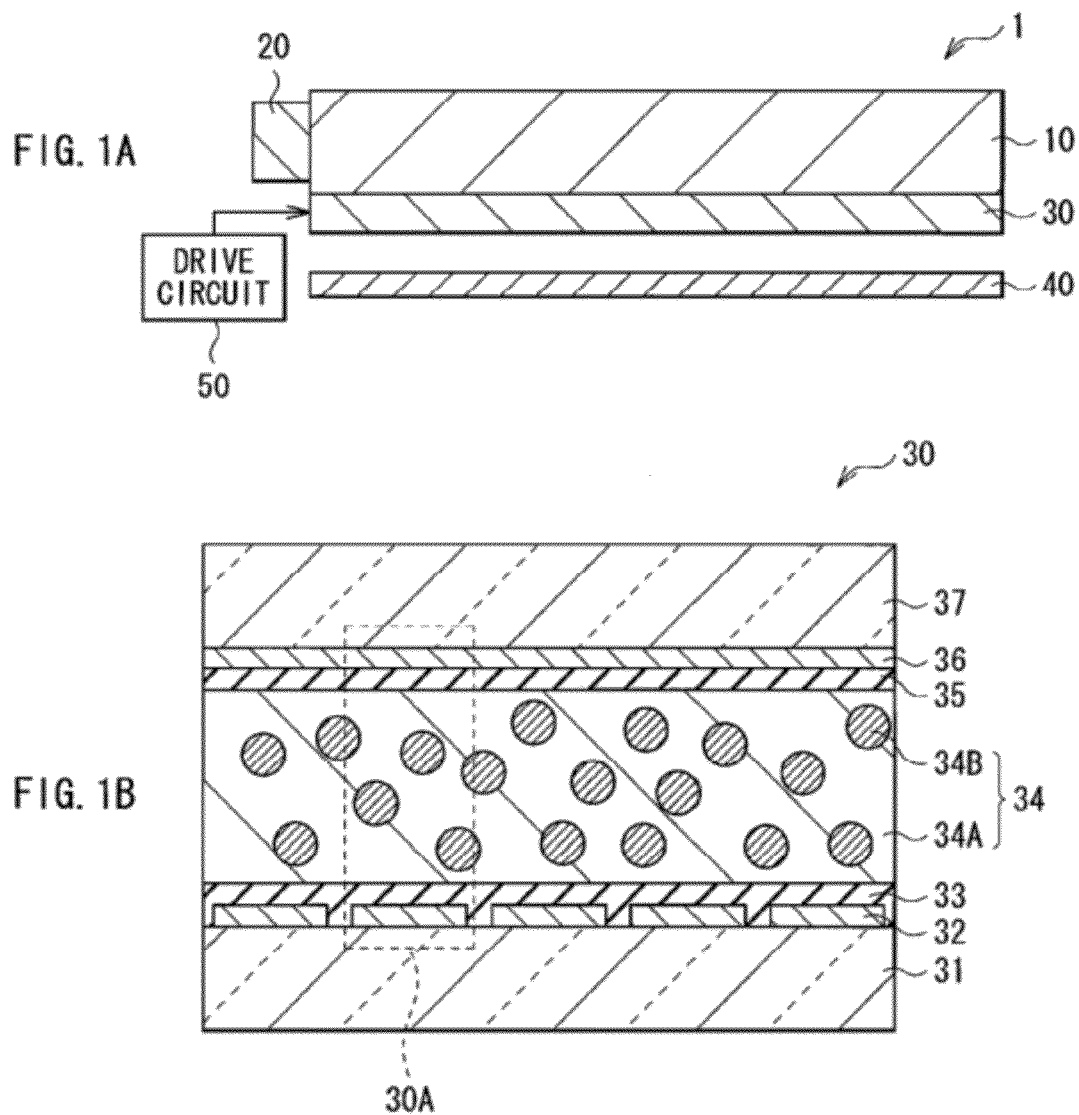
FIGS. 1A and 1B are cross sections illustrating an example of a configuration of a backlight according to an embodiment.

FIG. 1A illustrates an example of a sectional configuration of a backlight 1 (illuminating device) according to an embodiment. FIG. 1B illustrates an example of a sectional configuration of a light modulating element 30 of FIG. 1A. Note that FIGS. 1A and 1B are schematic diagrams, and dimensions and shapes are not always the same as actual ones. The backlight 1 illuminates, for example, a liquid crystal display panel or the like from the back, and has a light guide plate 10, a light source 20 disposed on a side face of the light guide plate 10, a light modulation element 30 and a reflector 40 disposed on the backside of the light guide plate 11, and a drive circuit 50 for driving the light modulation element 30.

The light guide plate 10 guides light from the light source 20, disposed on the side face of the light guide plate 10, to the top face of the light guide plate 10. The light guide plate 10 has a shape corresponding to a display panel (not illustrated) disposed on the top face of the light guide plate 10. For example, the light guide plate 10 has a rectangular parallelepiped shape surrounded by a top face, a bottom face, and side faces. The light guide plate 10 has a shape in which, for example, a predetermined pattern is formed in at least one of the top face and the bottom face, and has a function of scattering the light entered from the side face and uniformizing the same. In the case of uniformizing luminance by modulating voltage to be applied to the backlight 1, a flat light guide plate which is not patterned may be used as the light guide plate 10. The light guide plate 10 also functions, for example, as a supporting member that supports an optical sheet (for example, a diffusion plate, a diffusion sheet, a lens film, a polarization separation sheet, or the like) disposed between the display panel and the backlight 1. The light guide plate 10 mainly includes, for example, a transparent thermoplastic resin such as polycarbonate resin (PC), acrylic resin (polymethylmethacrylate (PMMA)), or the like.

The light source 20 is a linear light source, and is, for example, a hot cathode fluorescent lamp (HCFL), a CCFL, a plurality of LEDs disposed in a line, or the like. The light source 20 may be provided on only one side face of the light guide plate 10 as illustrated in FIG. 1A, or may be provided on two side faces, three side faces, or all of side faces of the light guide plate 10.

The reflector 40 returns light leaked from the back of the light guide plate 10 via the light modulation element 30 toward the light guide plate 10 side, and, for example, has the functions of reflection, diffusion, scattering, and the like. With the reflector 40, emission light from the light source 20 is efficiently used, and the front luminance is also improved. The reflector 40 is made by, for example, foamed polyethylene terephthalate (PET), a silver-deposited film, a multilayer reflection film, white PET, or the like.

In the present embodiment, the light modulation element 30 is closely attached to the back (under face) of the light guide plate 10 without an air layer. For example, the light modulation element 30 is adhered to the back of the light guide plate 10 via an adhesive (not illustrated). In the light modulation element 30, a transparent substrate 31, a bottom electrode 32, an orientation film 33, a light modulation layer 34, an orientation film 35, a top electrode 36, and a transparent substrate 37 are disposed in order from a side of the reflector 40, as illustrated in FIG. 1B for example.

Figure 2:
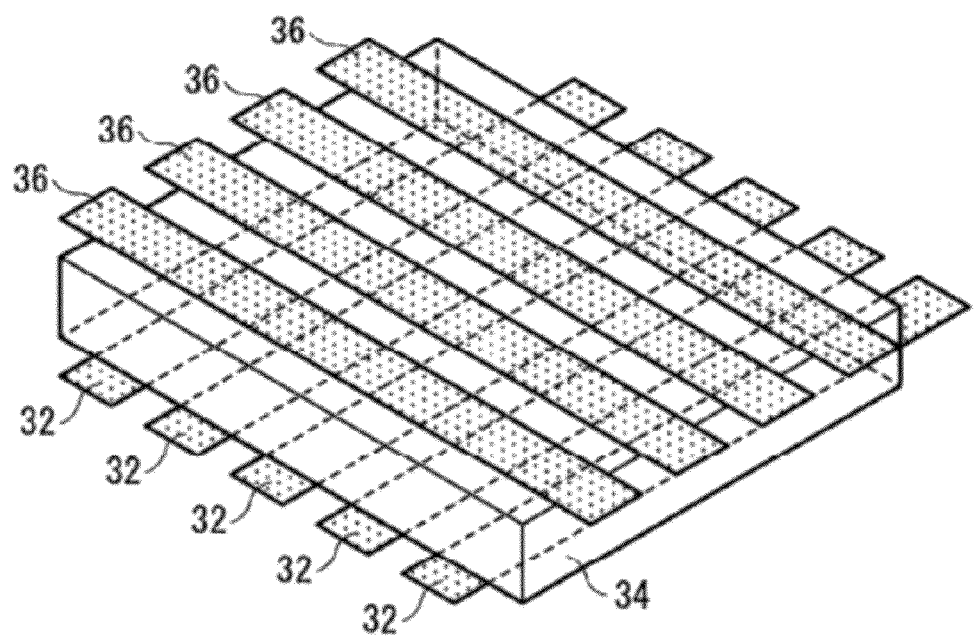
FIG. 2 is a cross section illustrating an example of a configuration of electrodes in FIG. 1B.

The transparent substrates 31 and 37 support the light modulation layer 34, and are generally substrates which are transparent to visible light, such as glass plates or plastic films. The bottom electrode 32 is provided on the surface of the transparent substrate 31 facing the transparent substrate 37. For example, as illustrated in a partial cutout of the light modulation element 30 in FIG. 2, the bottom electrode 32 has a band-like shape extending in one direction in the plane. The top electrode 36 is provided on the surface facing the transparent substrate 31, of the transparent substrate 37, and has, for example, a band-like shape extending in one direction in the plane and in the direction crossing (orthogonal to) the extending direction of the bottom electrode 32, as illustrated in FIG. 2.

The shapes of the bottom electrode 32 and the top electrode 36 depend on a driving method. For example, in the case where the shapes are band-like shapes as described above, the electrodes may be driven by a simple-matrix driving method. On the other hand, in the case where one of the electrodes is a solid film and the other electrode has a fine rectangular shape, for example, the electrodes may be driven by an active-matrix driving method.

Figure 3:
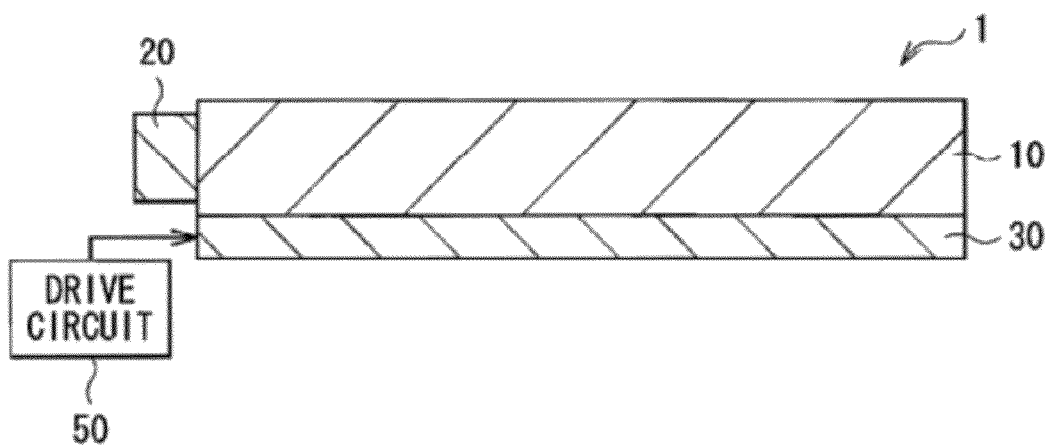
FIG. 3 is a cross section illustrating another example of the configuration of the backlight in FIG. 1A.

At least the top electrode 36 (the electrode on the top face side of the backlight 1) out of the bottom electrode 32 and the top electrode 36 is made of a transparent conductive material such as indium tin oxide (ITO). The bottom electrode 32 (the electrode on the under face side of the backlight 1) may not be made of a transparent material. For example, the bottom electrode 32 may be made of a metal. In the case where the bottom electrode 32 is made of a metal, the bottom electrode 32 also has a function of reflecting the light entering the light modulation element 30 from the back of the light guide plate 10 like the reflector 40. Therefore, in this case, the reflector 40 may not be provided as illustrated in FIG. 3 for example.

When the bottom electrode 32 and the top electrode 36 are seen from the normal direction of the light modulation element 30, a part corresponding to a portion where the bottom electrode 32 and the top electrode 36 face each other in the light modulation element 30 is structuring a light modulation cell 30A. Each of the light modulation cells 30A may be independently driven by applying a predetermined voltage to the bottom electrode 32 and the top electrode 36, and expresses transparency or scattering property to light from the light source 20 in accordance with the magnitude of voltage value applied to the bottom electrode 32 and the top electrode 36. The transparence or scattering property will be described in detail when explaining the light modulation layer 34.

The orientation films 33 and 35 are provided to orientate, for example, liquid crystals or monomers used for the light modulation layer 34. As the orientation films, there are a vertical orientation film and a horizontal orientation film, for example. Preferably, the vertical orientation films are used for the orientation films 33 and 35. For the vertical orientation film, a silane coupling material, polyvinyl alcohol (PVA), a polyimide-based material, a surface-activating agent, or the like may be used. Those materials need no rubbing process at the time of forming the orientation film, and are advantageous in terms of dust and static electricity. Also, in the case of using plastic films as the transparent substrates 31 and 37, it is preferable that the baking temperature after applying the orientation films 33 and 35 on the surface of the transparent substrates 31 and 37 respectively in the manufacturing process be as low as possible. Thus, it is preferable to use the silane coupling material, for which an alcohol-based solvent is usable, as the orientation films 33 and 35.

It is sufficient for each of the vertical and horizontal orientation films to have the function of orientating liquid crystal and monomers, and reliability obtained by repetitive application of voltage demanded by a normal liquid crystal display or the like may not be unnecessary, since the reliability by the voltage application after formation of the device is determined by an interface between a material formed by polymerizing monomers and the liquid crystal. Also, even when no orientation film is used, the liquid crystal and monomers used for the light modulation layer 34 are orientated for example, by applying electric field or magnetic field across the bottom electrode 32 and the top electrode 32. Specifically, an orientation state of the liquid crystal and monomers in a state where the voltage is applied is fixable by ultraviolet irradiation while applying the electric field or magnetic field across the bottom electrode 32 and the top electrode 36. In the case of using the voltage for forming the orientation films, an electrode for orientation and an electrode for driving may be separately formed, or a dual-frequency liquid crystal in which the sign of dielectric-constant anisotropy is inverted according to the frequency or the like may be used as the material of the liquid crystal. In the case of using the magnetic field for the formation of the orientation film, it is preferable to use a material having high magnetic susceptibility anisotropy. For example, it is preferable that a material having a large number of benzene rings be used as the material of the orientation film.

As illustrated in FIG. 1B, the light modulation layer 34 is, for example, a composite layer including a bulk 34A (second region) and a plurality of microparticles 34B (first region) spread in the bulk 34A. The bulk 34A and the microparticles 34B have optical anisotropy.

Figure 4A:
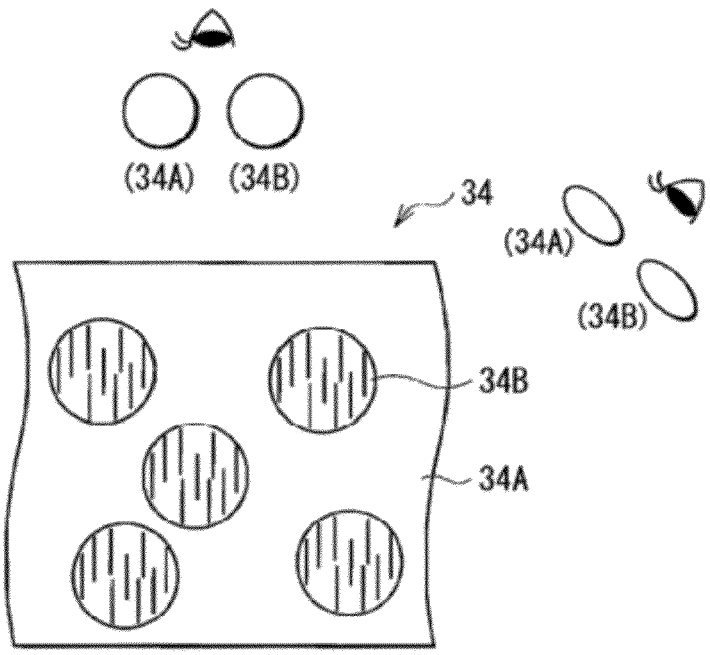
FIGS. 4A to 4C are schematic diagrams for explaining action of a light modulating element in FIG. 1B.
Figure 4B:
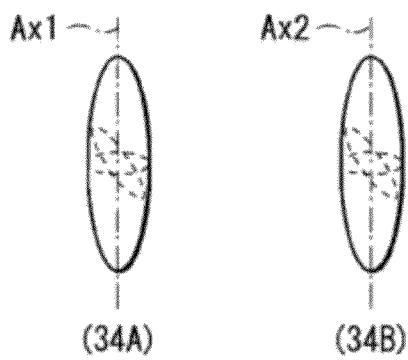
Figure 4C:
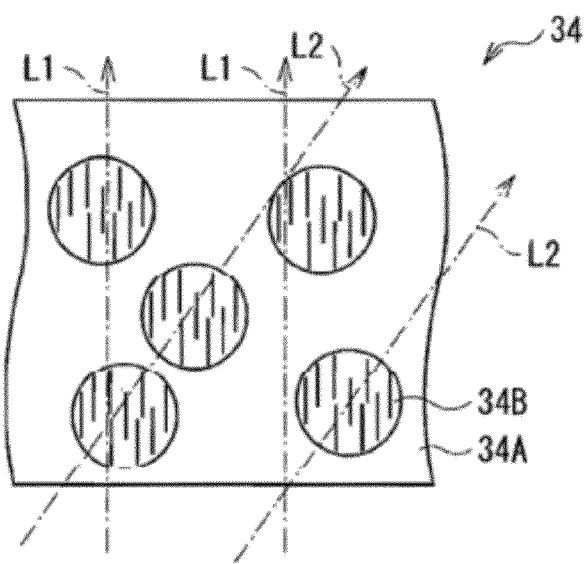

FIG. 4A schematically illustrates an example of an orientation state in the microparticle 34B when no voltage is applied across the bottom electrode 32 and the top electrode 36. In FIG. 4A, the orientation state in the bulk 34A is not illustrated. FIG. 4B illustrates an example of refractive-index ellipsoidal bodies expressing the refractive index anisotropy of the bulk 34A and the microparticle 34B when no voltage is applied across the bottom electrode 32 and the top electrode 36. The refractive-index ellipsoidal body is obtained by expressing the refractive indices of linearly polarized light entering from various directions by a tensor ellipsoid, and by seeing a section of the ellipsoidal body from a light incoming direction, the refractive index can be known geometrically. FIG. 4C schematically illustrates an example of a state where light L1 traveling in a front direction and light L2 traveling in an oblique direction pass through the light modulation layer 34 when no voltage is applied across the bottom electrode 32 and the top electrode 36.

Figure 5A:
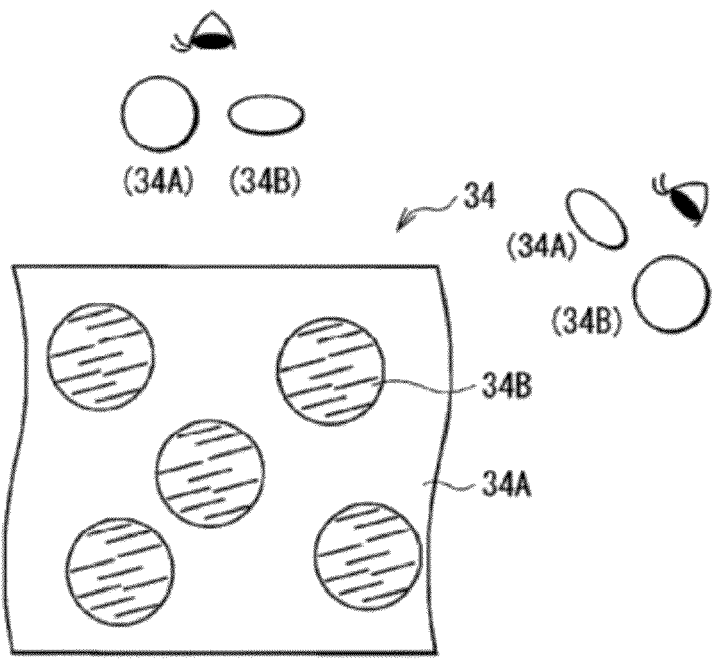
FIGS. 5A to 5C are schematic diagrams for explaining the action of the light modulating element in FIG. 1B.
Figure 5B:
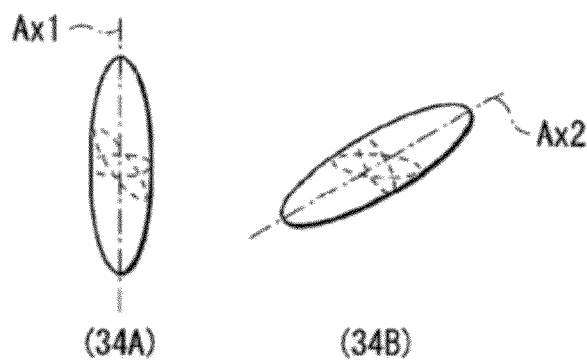
Figure 5C:
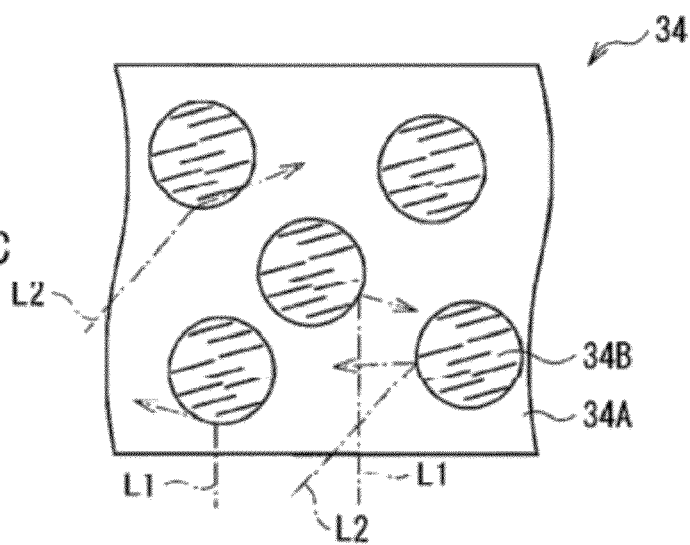

FIG. 5A schematically illustrates an example of an orientation state in the microparticle 34B when the voltage is applied across the bottom electrode 32 and the top electrode 36. In FIG. 5A, the orientation state in the bulk 34A is not illustrated. FIG. 5B illustrates an example of the refractive-index ellipsoidal bodies expressing the refractive-index anisotropy of the bulk 34A and the microparticle 34B when the voltage is applied across the bottom electrode 32 and the top electrode 36. FIG. 5C schematically illustrates an example of a state where the light L1 traveling in the front direction and the light L2 traveling in the oblique direction are scattered in the light modulation layer 34 when the voltage is applied across the bottom electrode 32 and the top electrode 36.

As illustrated in FIGS. 4A and 4B, the bulk 34A and the microparticle 34B have, for example, a structure in which the orientation of an optical axis AX1 of the bulk 34A and that of an optical axis AX2 of the microparticle 34B coincide with each other (are parallel to each other) when no voltage is applied across the bottom electrode 32 and the top electrode 36. The optical axes AX1 and AX2 here refer to a line parallel to a traveling direction of light ray in which a refractive index is fixed in one value irrespective of a polarization direction. It is to be noted that the orientations of the optical axes AX1 and AX2 do not necessarily have to coincide with each other, but may be slightly deviated from each other due to a manufacturing error or the like for example.

Also, when no voltage is applied across the bottom electrode 32 and the top electrode 36 for example, the optical axis AX2 of the particle 34B is orthogonal to surfaces of the transparent substrates 31 and 37. On the other hand, as illustrated in FIGS. 4A, 4B, 5A and 5B for example, the optical axis AX1 of the bulk 34A is orthogonal to the surfaces of the transparent substrates 31 and 37 irrespective of application of a voltage across the bottom electrode 32 and the top electrode 36. The optical axis AX2 here does not always have to be orthogonal to the surfaces of the transparent substrates 31 and 37, but may cross the surfaces of the transparent substrates 31 and 37 at an angle other than 90 degrees due to a manufacturing error or the like for example. The optical axis AX1 also does not always have to be orthogonal to the surfaces of the transparent substrates 31 and 37, but may also cross the surfaces of the transparent substrates 31 and 37 due to the manufacturing error or the like for example.

Preferably, an ordinary light refractive index of the bulk 34A and that of the microparticle 34B are equal to each other, and an extraordinary light refractive index of the bulk 34A and that of the microparticle 34B are equal to each other. In this case, when no voltage is applied across the bottom electrode 32 and the top electrode 36 for example, there is hardly any difference in the refractive index in all of directions including the front direction and oblique directions as illustrated in FIG. 4A, and thus high transparency is obtained. Thereby, as illustrated in FIG. 4C for example, the light L1 traveling in the front direction and the light L2 traveling in the oblique direction pass through the light modulation layer 34 without being scattered in the light modulation layer 34. As a result, as illustrated in part (A) and part (B) of FIG. 6 for example, light L from the light source 20 (light from the oblique direction) is totally reflected by an interface of the transparent region 30A (the interface between the transparent substrate 31 or the light guide plate 10 and air). Hence, the luminance of the transparent region 30A (the luminance in black display) becomes lower than that in the case where the light modulation element 30 is not provided (the alternate long and short dash line in part (B) of FIG. 6).

When the voltage is applied across the bottom electrode 32 and the top electrode 36 for example, the bulk 34A and the microparticle 34B have a structure in which the orientation of the optical axis AX1 of the bulk 34A and that of the optical axis AX2 of the particle 34B are different from each other (orthogonal to each other) as illustrated in FIG. 5A. The microparticle 34B has a structure in which, when the voltage is applied across the bottom electrode 32 and the top electrode 36 for example, the optical axis AX2 of the microparticle 34B crosses the surfaces of the transparent substrates 31 and 37 at an angle other than 90 degrees or is parallel to the surfaces of the transparent substrates 31 and 37. Therefore, when the voltage is applied across the bottom electrode 32 and the top electrode 36, the difference in the refractive index increases in all of the directions including the front direction and the oblique directions in the light modulation layer 34, and thus high scattering performance is obtained. Thereby, as illustrated in FIG. 5C for example, the light L1 traveling in the front direction and the light L2 traveling in the oblique direction are scattered in the light modulation layer 34. As a result, as illustrated in part (A) and part (B) of FIG. 6 for example, the light L from the light source 20 (light from the oblique direction) passes through the interface of the scatter region 30B (the interface between the transparent substrate 31 or the light guide plate 10 and air), and the light having passed therethrough toward the reflector 40 is reflected by the reflector 40 and passes through the light modulation element 30. Therefore, the luminance of the scatter region 30B becomes extremely higher than that in the case where the light modulation layer 30 is not provided (the alternate long and short dash line in part (B) of FIG. 6), and moreover, the luminance in a partial white display (luminance protrusion) increases by a decreased amount of the luminance in the transparent region 30A.

The ordinary light refractive index of the bulk 34A and that of the microparticle 34B may be slightly deviated from each other due to a manufacturing error or the like for example, and is preferably 0.1 or less, and is more preferably 0.05 or less. The extraordinary light refractive index of the bulk 34A and that of the microparticle 34B may also be slightly deviated from each other due to the manufacturing error or the like for example, and is preferably 0.1 or less, and is more preferably 0.05 or less.

Also, it is preferable that the refractive index difference ($\Delta n_o$=ordinary light refractive index $n_o$–extraordinary light refractive index $n_1$) of the bulk 34A and the refractive index difference ($\Delta n_1$=ordinary light refractive index $n_2$–extraordinary light refractive index $n_3$) of the microparticle 34B be as large as possible. For example, the refractive index difference of the bulk 34A and the refractive index difference of the microparticle 34B are preferably 0.05 or larger, more preferably 0.1 or larger, and further more preferably 0.15 or larger. This is because the scattering power of the light modulation layer 34 becomes higher in the case where the refractive index differences of the bulk 34A and the microparticle 34B are large, and thus conditions for guiding light can be easily broken, and the light from the light guide plate 10 can be easily extracted.

Response speeds to the electric field of the bulk 34A and the microparticle 34B are different from each other. For example, the bulk 34A has a streaky structure or a porous structure which does not respond to an electric field, or a rod structure having the response speed lower than that of the microparticle 34B. The bulk 34A is formed by, for example, polymerizing a material (for example, monomer) having an orientation property and the polymerization property, oriented along the orientation direction of the microparticle 34B or the orientation direction of the orientation films 33 and 35, with at least one of heat and light. On the other hand, the microparticle 34B mainly includes a liquid crystal material, and has the response speed sufficiently higher than that of the bulk 34A, for example.

The monomer having the orientation property and the polymerization property may be a material having optical anisotropy and combined with the liquid crystal. In the present embodiment, it is preferable that the monomer having the orientation property and the polymerization property is low-polymer monomer which is cured with ultraviolet light. Since the direction of the optical anisotropy of the liquid crystal and that of a material (high-polymer material) obtained by polymerizing the low-polymer monomer preferably coincide with each other in the state in which the voltage is not applied, it is preferable that the liquid crystal and the low-polymer monomer be oriented in the same direction before curing with the ultraviolet light. In the case where the liquid crystal is used as the microparticle 34B, it is preferable that the shape of the monomer material used is a rod shape when the liquid crystal is a rod-like molecule. Accordingly, it is preferable that a material having the polymerization property and the liquid crystal property be used for the monomer material. For example, it is preferable to have, as a polymerizable functional group, at least one functional group selected from a group of an acryloyloxy group, a methacryloyloxy group, a vinyl ether group, and an epoxy group. These functional groups may be polymerized by being irradiated with ultraviolet light, infrared light, or an electron beam, or heated. A liquid crystal material having a polyfunctional group may be added to suppress decrease in the degree of orientation at the time of the ultraviolet irradiation.

The drive circuit 50 controls, for example, the magnitude of the voltage applied to the pair of electrodes (the bottom electrode 32 and the top electrode 36) in each of the light modulation cells 30B, so that the optical axis AX2 of the microparticle 34B becomes parallel to the optical axis AX1 of the bulk 34A in one light modulation cell 30A, and the optical axis AX2 of the microparticle 34B crosses the optical axis AX1 of the bulk 34A in another light modulation cell 30A.

Now, a method of manufacturing the backlight 1 according to the present embodiment will be described below with reference to FIGS. 7A-7C to FIGS. 9A-9C.

Figure 7A:
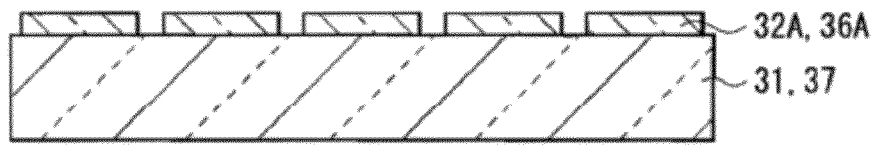
FIGS. 7A to 7C are cross sections for explaining processes of manufacturing the backlight in FIG. 1A.
Figure 7B:
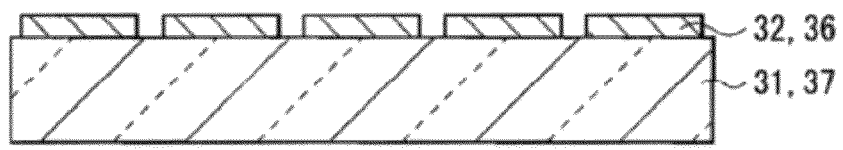

First, transparent conductive films 32A and 36A made of ITO or the like are formed on the transparent substrates 31 and 37 which are glass substrates or plastic film substrates (FIG. 7A). Next, a resist layer is formed on the entire surface, and thereafter, an electrode pattern (the bottom electrode 32 and the top electrode 36) is formed in the resist layer by patterning (FIG. 7B).

As a method of patterning, preferably, photolithography, a laser abrasion method, or the like is used. The electrode pattern is determined by the driving method and the number of divisions of the partial driving. For example, in the case of dividing a 42-inch display into 12×6 pieces, a pattern in which an electrode width is about 80 mm is formed, and a slit between electrodes is narrowed as much as possible. However, since there is not so much significance in narrowing the slit too much because of a gradation characteristic which will be described later, a slit of about 10 to 500 μm is preferred as a concrete example. Alternatively, the electrode pattern may be formed by printing ITO nano particles in a pattern and baking the same.

Figure 7C:
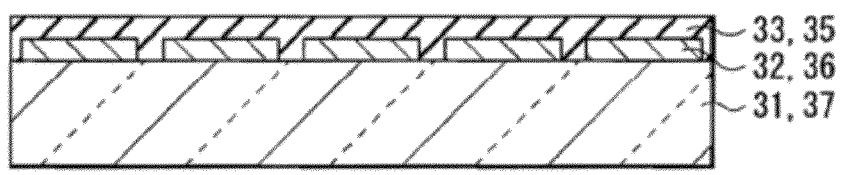

Next, the orientation films 33 and 35 are applied on the entire surface, and are then dried and burned (FIG. 7C). In the case of using a polyimide-based material for the orientation films 33 and 35, NMP (N-methyl-2-pyrrolidone) is often used as a solvent. In this case, a temperature of about 200° C. is desirable in the atmosphere. In the case of using the plastic substrates as the transparent substrates 31 and 37, the orientation films 33 and 35 may be vacuum-dried at 100° C. and burned.

Figure 8A:
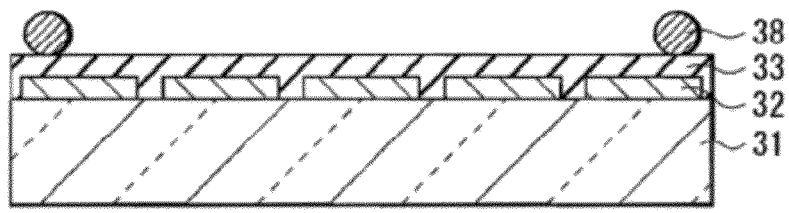
FIGS. 8A to 8C are cross sections for explaining the manufacturing processes subsequent to FIG. 7C.

Then, spacers 38 for forming cell gaps are sprayed on the orientation film 33 by a dry method or wet method (FIG. 8A). In the case of forming the light modulation cell 30A by a vacuum joining method, the spacers 38 may be mixed in a mixture to be dropped. Also, columnar spacers may be formed by photolithography, in place of the spacers 38.

Figure 8B:
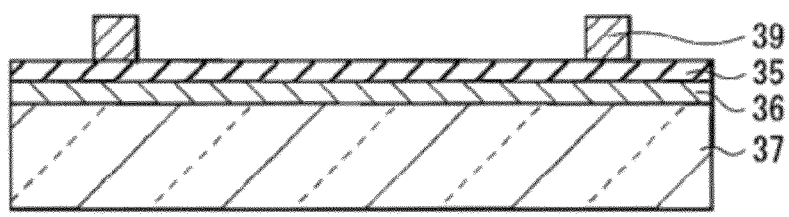

Subsequently, a seal agent 39 for adhesion and preventing leakage of the liquid crystal is applied, for example, in a frame shape on the orientation film 35 (FIG. 8B). The seal agent pattern 39 may be formed by a dispenser method or a screen printing method.

Hereinbelow, the vacuum joining method (one-drop-fill method (ODF method)) will be described. Note that the light modulation cell 30A may also be formed by a vacuum injection method or the like.

Figure 8C:
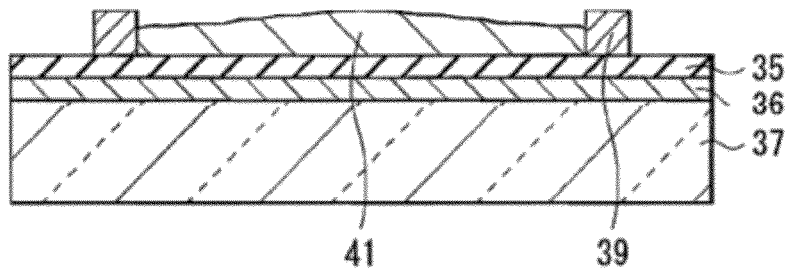

First, a mixture 41 of liquid crystal and monomers corresponding to a volume determined by a cell gap, a cell area, and the like is dropped uniformly within a face (FIG. 8C). It is preferable that the mixture 41 be dropped by using a precise dispenser of a linear guide type. Also, a die coater or the like may be employed by using the seal agent pattern 39 as a bank.

The above-described materials may be used as the liquid crystal and the monomers. A ratio by weight between the liquid crystal and the monomers is 98:2 to 50:50, preferably 95:5 to 75:25, and more preferably 92:8 to 85:15. It is possible to lower the drive voltage by increasing the ratio of the liquid crystal. However, there may be a tendency that, when the liquid crystal is increased too much, the degree of white at the time of the voltage application may be decreased, or the response speed after turn-off of voltage may be decreased and a state may not easily return to a transparent state.

Other than the liquid crystal and the monomers, a polymerization initiator is added to the mixture 41. A monomer ratio of the polymerization initiator to be added is adjusted in a range of 0.1 to 10% by weight in accordance with the ultraviolet wavelength used. In addition, a polymerization inhibitor, a plasticizer, a viscosity modifier, or the like may be added in the mixture 41 as necessary. In the case where the monomer is a solid or gel at room temperature, it is preferable that a cap, a syringe, and a substrate be warmed.

Then, the transparent substrates 31 and 37 are disposed in a vacuum joining machine (not illustrated). Thereafter, evacuation is performed to join the transparent substrates 31 and 37 (FIG. 9A). The resultant is then released to the atmosphere to uniformize the cell gaps by uniform pressurization of atmospheric pressure. The cell gap may be selected as needed on the basis of a relationship between white luminance (the degree of whiteness) and the drive voltage. For example, the cell gap is 5 to 40 μm, preferably 6 to 20 μm, and more preferably 7 to 10 μm.

After the joining operation, it is preferable that an orientating process be performed as necessary (not illustrated). In the case where light leaks when the joined cells are inserted between cross Nicol polarizers, the cells are heated for predetermined time or left at room temperature so that they are orientated. Thereafter, the monomers are polymerized by irradiation with ultraviolet rays L3 to form polymer (FIG. 9B). In such a manner, the light modulation element 30 is manufactured (FIG. 9C).

It is preferable that the temperature of the cells be prevented from being changed while the ultraviolet rays are irradiated. It is preferable to use an infrared cut filter, or use an UV-LED or the like as a light source. Since the ultraviolet illumination exerts an influence on an organization structure of a composite material, it is preferable that the ultraviolet illumination be adjusted as needed on the basis of the liquid crystal material and the monomer material used, or of the composition of the liquid crystal material and the monomer material. A range of 0.1 to 500 mW/cm$^2$ is preferable, and a range of 0.5 to 30 mW/cm$^2$ is more preferable for the ultraviolet illumination. There is a tendency that the lower the ultraviolet illumination is, the lower the drive voltage becomes. Thus, preferable ultraviolet illumination may be selected in consideration of both of productivity and characteristics.

Then, the light modulation element 30 is joined to the light guide plate 10. The joining of the light modulation element 30 and the light guide plate 10 may be carried by adhesion or bonding. Preferably, the light modulation element 30 is adhered or bonded with a material having a refractive index which is close to a refractive index of the light guide plate 10 and a refractive index of a substrate material of the light modulation element 30 as much as possible. Finally, a lead line (not illustrated) is attached to each of the bottom electrode 32 and the top electrode 36. In such a manner, the backlight 1 according to the present embodiment is manufactured.

Accordingly, the process of forming the light modulation light 30 and finally joining the light modulation light 30 to the light guide plate 10 has been described. However, it is also possible to preliminarily join the transparent substrate 37 over which the orientation film 35 is formed to the surface of the light guide plate 10, and to form the backlight 1 thereafter. Also, the backlight 1 may be formed by any of a sheet method and a roll-to-roll method.

Now, action and effect of the backlight 1 according to the present embodiment will be described.

Figure 6:
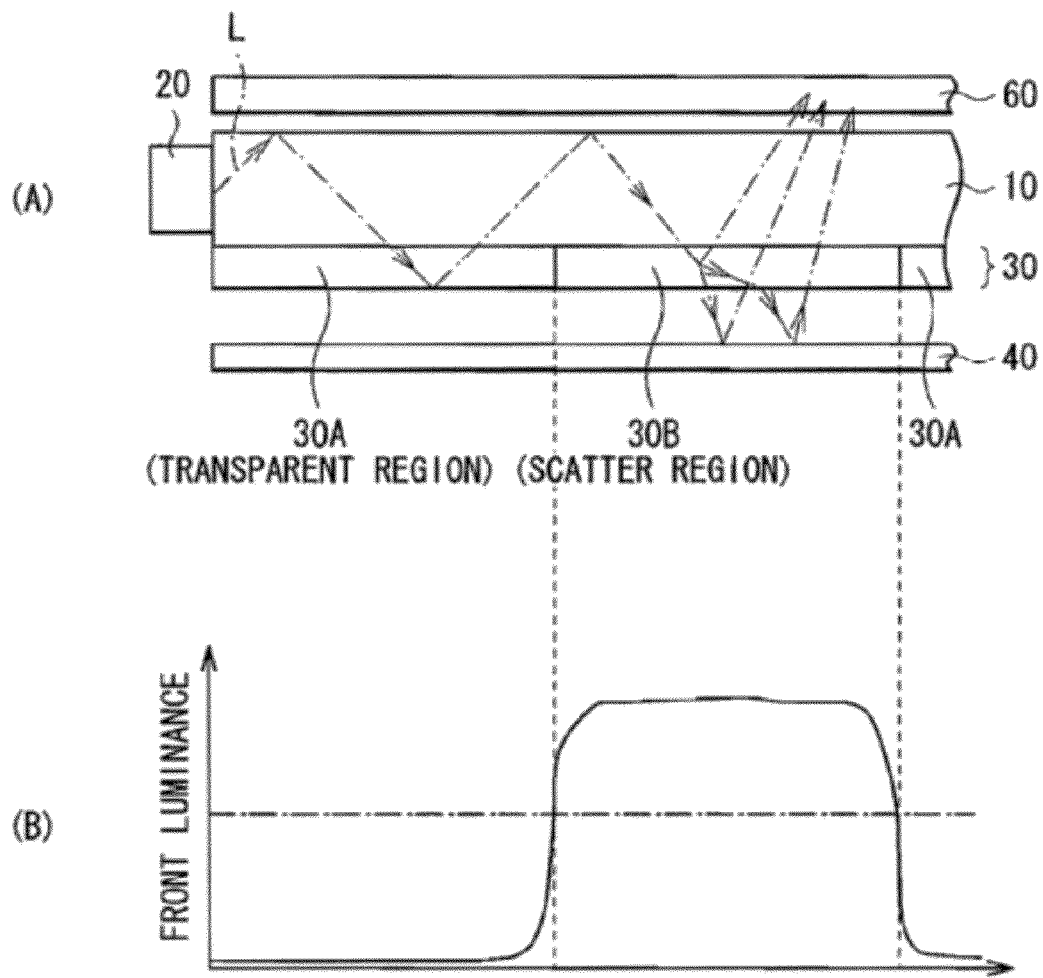
FIG. 6 is a schematic diagram for explaining action of the backlight in FIG. 1A.

In the backlight 1 according to the present embodiment, the light from the light source 20 enters the light guide plate 10, and is reflected by the top face of the light guide plate 10 and the under face of the transparent region 30A in the light modulation element 30 to propagate in the light guide plate 10 and the light modulation element 30 (see part (A) of FIG. 6). At this time, the light propagating in the light guide plate 10 and the light modulation element 30 is scattered in the scatter region 30B in the light modulation element 30. The light having passed through the under face of the scatter region 30B in the scattered light is reflected by the reflector 40 and returns to the light guide plate 10 again, and is then emitted from the top face of the backlight 1. The light having traveled toward the top face of the scatter region 30B in the scattered light passes through the light guide plate 10, and is then emitted from the top face of the backlight 1. Accordingly, in the present embodiment, the light is hardly emitted from the top face of the transparent region 30A, but the light is emitted from the top face of the scatter region 30B. In such a manner, the modulation ratio in the front direction is increased.

Generally, the PDLC is formed by mixing the liquid crystal material and an isotropic low-polymer material and causing phase separation by ultraviolet irradiation, drying of a solvent, or the like, and is a composite layer in which microparticles of the liquid crystal material are dispersed in a high-polymer material. The liquid crystal material in the composite layer is oriented in random directions when no voltage is applied and thus it shows the scattering property. When the voltage is applied, the liquid crystal material is oriented in the electric field direction, and thus, in the case where the ordinary light refractive index of the liquid crystal material and the refractive index of the high-polymer material are equal to each other, high transparency is expressed in the front direction (the normal direction of the PDLC). However, in the liquid crystal material, the difference between the extraordinary light refractive index of the liquid crystal material and the refractive index of the high-polymer material becomes conspicuous in an oblique direction. Therefore, even if the transparency is expressed in the front direction, the scattering property appears in the oblique direction.

Usually, the light modulation element using the PDLC has often a structure obtained by sandwiching the PDLC between two glass plates on each of which a transparent conductive film is formed. In the case where light is obliquely incident from the air onto the light modulation element having the above-described structure, the light incident from the oblique direction is refracted by the refractive index difference between the air and the glass plate, and is incident on the PDLC at a smaller angle. Consequently, large scattering does not occur in such a light modulation element. For example, in the case where light is incident from the air at an angle of 80 degrees, the incident angle of the light to the PDLC is decreased to about 40 degrees by refraction in the glass interface.

However, in the edge light method using the light guide plate, since light is incident through the light guide plate, the light crosses the PDLC at a large angle of about 80 degrees. Thus, the difference between the extraordinary light refractive index of the liquid crystal material and the refractive index of the high-polymer material is large, and further, an optical path subjected to the scattering also becomes longer, since the light crosses the PDLC at the larger angle. For example, in the case where the microparticles of a liquid crystal material having an ordinary light refractive index of 1.5 and an extraordinary light refractive index of 1.65 are dispersed in a high-polymer material having a refractive index of 1.5, there is no refractive index difference in the front direction (the normal direction of the PDLC) but the refractive index difference is large in the oblique direction. Therefore, it is difficult to decrease the scattering property in the oblique direction, so that the view angle characteristic is bad. Further, in the case where an optical film such as a diffusion film is provided on the light guide plate, oblique leak light is diffused also in the front direction by the diffusion film, so that the light leakage in the front direction increases, and the modulation ratio in the front direction becomes lower.

On the other hand, in the present embodiment, the bulk 34A and the microparticles 34B are formed by including mainly the optical anisotropy material. Thus, the scattering property decreases in the oblique direction, and the transparency is improved. For example, in the case where the bulk 34A and the microparticles 34B mainly include the optical anisotropic materials whose ordinary light refractive indices are equal to each other and whose extraordinary light refractive indices are also equal to each other, and where the directions of the optical axes of those coincide with each other, there is no refractive index difference in all of the directions including the front direction (the normal direction of the light modulation element 30) and the oblique direction, and thus high transparency is obtained.

For example, when liquid crystal having an ordinary light refractive index of 1.5 and an extraordinary light refractive index of 1.65 and liquid crystal monomers having an ordinary light refractive index of 1.5 and an extraordinary light refractive index of 1.65 are mixed and the liquid crystal monomers are polymerized in a state where the liquid crystal and the liquid crystal monomers are oriented by an orientation film or electric field, an optical axis of the liquid crystal and that of a polymer formed by polymerizing the liquid crystal monomers coincide with each other. As a result, the refractive indices coincide with each other in all of the directions, so that a state where transparency is high is realized.

Therefore, leakage of light in a range where the view angle is large is reduced or almost eliminated in a dark state. Thus, it is possible to improve the view angle characteristic. Also, the luminance of a part in a light state is increased by the decreased amount in the light leakage amount. Therefore, in the present embodiment, it is possible to reduce or almost eliminate the leakage of light in the range where the view angle is large while improving the display luminance. As a result, it is possible to make the modulation ratio in the front direction higher.

Also, in the present embodiment, as illustrated in part (A) and part (B) of FIG. 6, the luminance in the transparent region 30A (luminance in black display) is lower than that in the case where the light modulation element 30 is not provided (the alternate long and short dash line in part (B) of FIG. 6), for example. On the other hand, the luminance in the scatter region 30B is extremely higher than that in the case where the light modulation element 30 is not provided (the alternate long and short dash line in part (B) of FIG. 6). Moreover, the luminance in the partial white display (luminance protrusion) is increased by the decreased amount of luminance in the transparent region 30A.

The luminance protrusion is a technique of increasing luminance in the case where white display is performed partially as compared with the case where white display is performed in the entire screen. This technique is often generally used in a CRT, PDP, or the like. However, in a liquid crystal display, the backlight generates light uniformly regardless of an image, so that it is difficult to increase the luminance partially. In the case of using an LED backlight in which a plurality of LEDs are two-dimensionally disposed as the backlight, the LEDs may be partially turned off. In such a case, however, there is no diffusion light from a dark region in which the LEDs are turned off. Thus, the luminance becomes lower as compared with the case where all of the LEDs are turned on. Also, the luminance may be increased by increasing current to be applied to the LEDs which are partially turned on. In such a case, however, large current flows in very short time, so that there is an issue in terms of the load on the circuit and reliability.

On the other hand, in the present embodiment, the bulk 34A and the microparticles 34B are formed by including mainly the optical anisotropy material. Thus, the scattering in the oblique direction is suppressed, and the leak light from the light guide plate in the dark state is little. Therefore, since the light is guided from the part of the partially-dark state to the part of the partially-light state, it is possible to realize the luminance protrusion without increasing power supplied to the backlight 1.

[Modifications]

Figure 10:
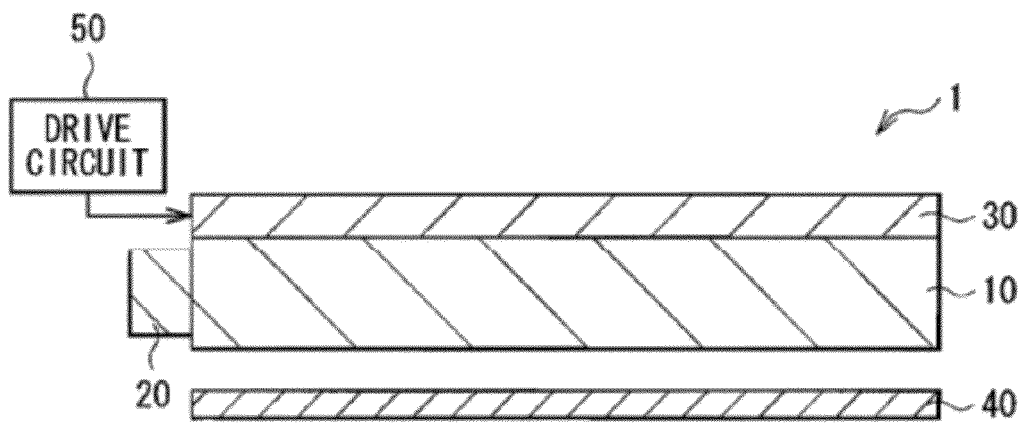
FIG. 10 is a cross section illustrating another example of the configuration of the backlight in FIG. 1A.
Figure 11:
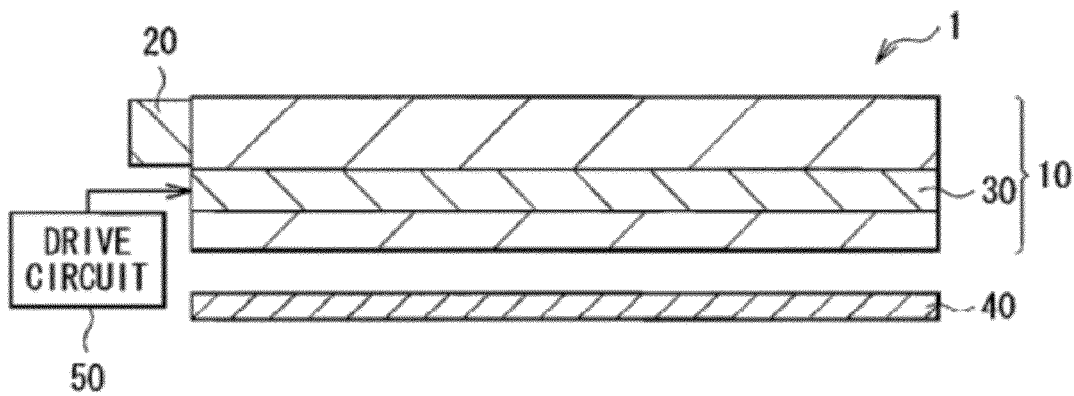
FIG. 11 is a cross section illustrating another example of the configuration of the backlight in FIG. 1A.

In the foregoing embodiment, the light modulation element 30 is closely joined to the back (under face) of the light guide plate 10 without an air layer. However, the light modulation element 30 may be closely joined, for example, to the top face of the light guide plate 10 without an air layer as illustrated in FIG. 10. Also, the light modulation element 30 may be provided on the inside of the light guide plate 10, for example, as illustrated in FIG. 11. In this case as well, it is desirable that the light modulation element 30 be closely joined to the light guide plate 10 without an air layer.

Figure 12:
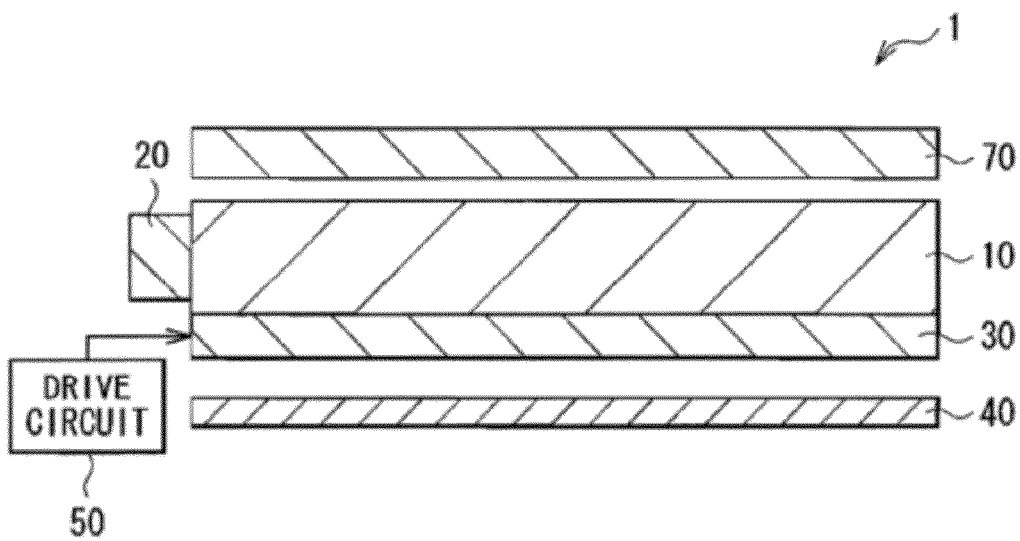
FIG. 12 is a cross section illustrating another example of the configuration of the backlight in FIG. 1A.

Also, in the foregoing embodiment, no member is particularly provided over the light guide plate 10. However, for example, an optical sheet 70 (such as a diffuser, a diffusion sheet, a lens film, a polarization separation sheet, or the like) may be provided over the light guide plate 10 as illustrated in FIG. 12.

[Application Example]

Next, an application example of the backlight 1 according to the present embodiment will now be described.

Figure 13:
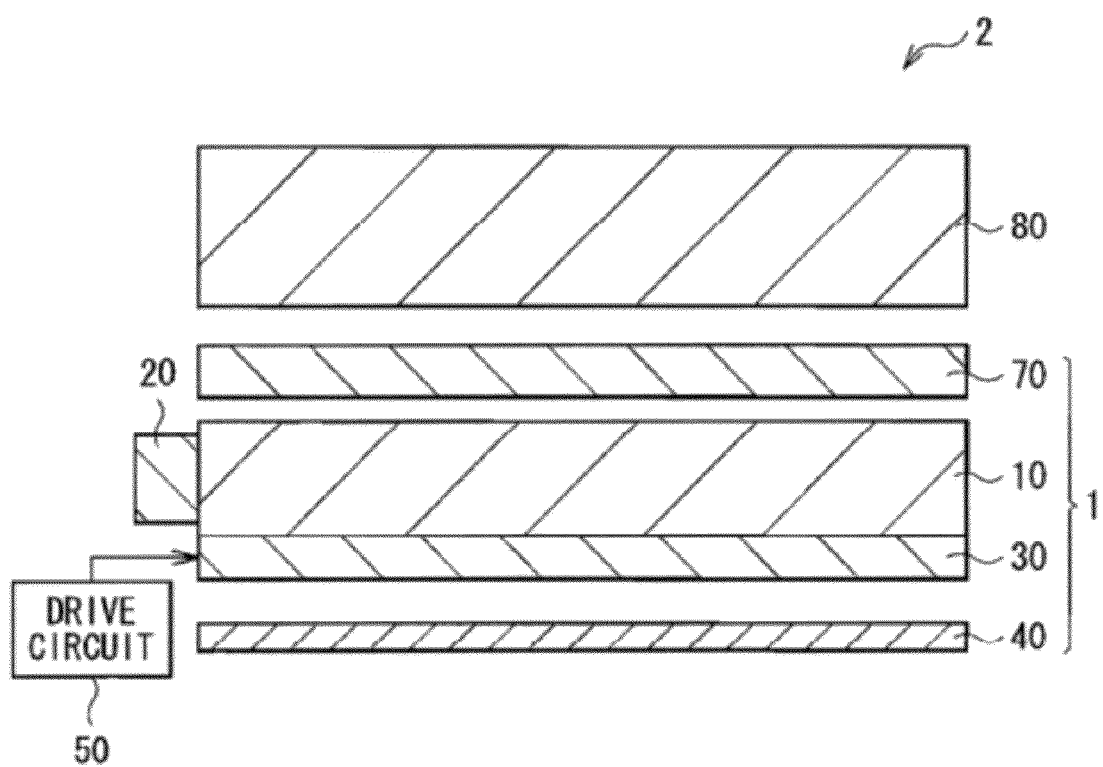
FIG. 13 is a cross section illustrating an example of a display device according to an application example.
Figure 14C:
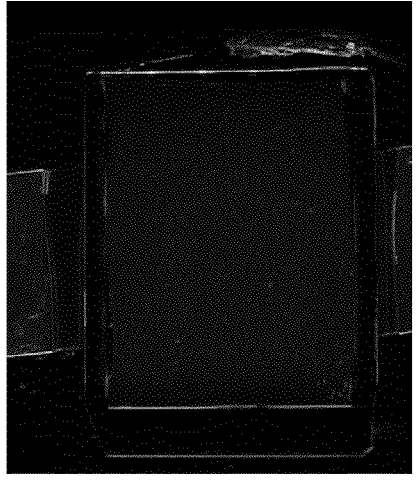
FIGS. 14A to 14D illustrate states of leaked light of the display devices according to examples and display devices according to comparative examples.
Figure 14D:
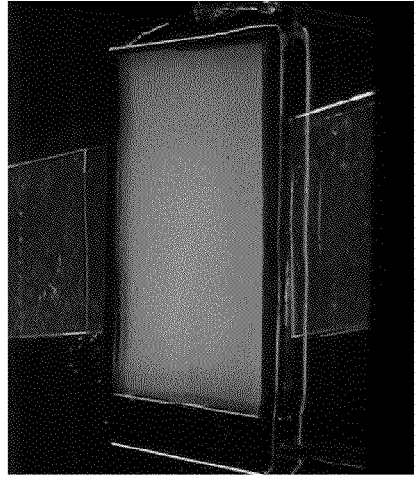
Figure 14A:
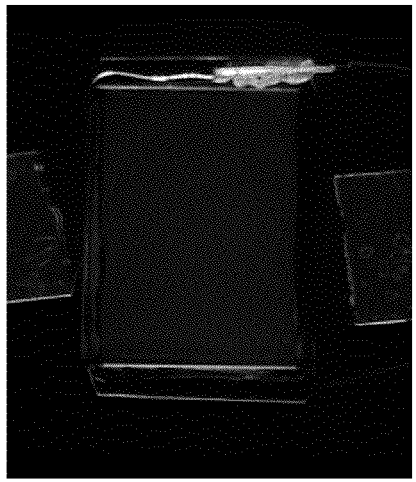
Figure 14B:
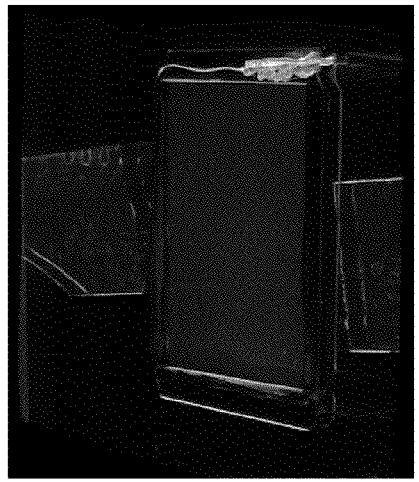

FIG. 13 illustrates an example of a schematic configuration of a display device 2 according to the application example. The display device 2 is provided with a liquid crystal display panel 80 (display panel), and the backlight 1 disposed at the back of the liquid crystal display panel 80.

The liquid crystal display panel 80 is provided to display a video image. The liquid crystal display panel 80 is, for example, a transmissive liquid crystal display in which pixels are driven in accordance with a video signal. The liquid crystal display panel 80 has a structure in which a liquid crystal layer is sandwiched by a pair of transparent substrates. Specifically, the liquid crystal display panel 80 has, in order from the backlight 1 side, a polarizer, a transparent substrate, a pixel electrode, an orientation film, a common electrode, a color filter, a transparent substrate, and a polarizer.

The transparent substrate is a substrate transparent to visible light. For example, the transparent substrate is a plate glass. In the transparent substrate on the backlight 1 side, active drive circuits including TFTs (Thin Film Transistors) electrically connected to pixel electrodes, and wires and so forth are formed, which are not illustrated. The pixel electrodes and common electrodes are made of, for example, ITO. The pixel electrodes are disposed in lattice or delta arrangement on the transparent substrate, and function as electrodes of respective pixels. On the other hand, the common electrodes are formed on the entire surface of a color filter, and function as common electrodes facing the pixel electrodes. The orientation film is made of a high polymer material such as polyimide, and performs an orienting process on the liquid crystal. The liquid crystal layer is made of, for example, liquid crystal in a VA (Vertical Alignment) mode, a TN (Twisted Nematic) mode, or an STN (Super Twisted Nematic) mode, and has a function of changing the orientation of the polarizing axis of light emitted from the backlight 1 by application voltage from a drive circuit (not illustrated) for each pixel. The orientation of the transmission axis of each pixel is adjusted in multiple stages by changing the arrangement of the liquid crystal in multiple stages. In the color filter, color filters for separating light, having passed through the liquid crystal layer, into three primary colors of red (R), green (G), and blue (B) or into four colors of R, G, B, and white (W) for example, are arranged in correspondence with the array of the pixel electrodes. The filter array (pixel array) includes generally a stripe array, a diagonal array, a delta array, and a rectangle array.

The polarizer is a kind of an optical shutter, and transmits only the light in a certain vibration direction (polarized light). The polarizer may be a polarizing element of an absorption type that absorbs light in a vibration direction (polarized light) other than the transmission axis, but is preferably a polarizing element of a reflection type that reflects the light to the backlight 1 side, in terms of improved luminance. The polarizers are disposed so that their polarization axes are different by 90 degrees. Thereby, light emitted from the backlight 1 passes through the liquid crystal or is interrupted.

The drive circuit 50 controls, for example, the magnitude of the voltage applied to the pair of electrodes (the bottom electrode 32 and the top electrode 36) of each of the light modulation cells 30A, so that the optical axis AX2 of the microparticle 34B becomes parallel to the optical axis AX1 of the bulk 34A in a cell corresponding to a pixel position of black display in the plurality of light modulation cells 30A, and that the optical axis AX2 of the microparticle 34B crosses the optical axis AX1 of the bulk 34A in a cell corresponding to a pixel position of white display in the plurality of light modulation cells 30A.

In the present application example, the backlight 1 of the foregoing embodiment is used as the light source for illuminating the liquid crystal display panel 80. This makes it possible to reduce or almost eliminate the leakage of light in the range where the view angle is large, while improving the display luminance. As a result, it is possible to increase the modulation ratio in the front direction. Also, it is possible to realize the luminance protrusion without increasing the power supplied to the backlight 1.

Also, in the present application example, the backlight 1 modulates the intensity of light partially entering the liquid crystal display panel 80 in accordance with a display image. However, if there is a sharp luminance change in a pattern edge part in the electrodes (the bottom electrode 32 and the top electrode 36) included in the light modulation element 30, the border part of the change is seen also in the display image. Therefore, a characteristic that lightness monotonously changes in the electrode border part as much as possible is demanded. Such a characteristic is referred to as a blur characteristic. It is effective to use a diffuser having a strong diffusion property in order to increase the blur characteristic. However, when the diffusion property is strong, the total light transmittance becomes low, and there is a tendency that lightness decreases. Therefore, in the case of using the diffuser as the optical sheet 70 in the present application example, the total light transmittance of the diffuser is preferably 50% to 85% and, more preferably 60% to 80%. In addition, the longer a spatial distance between the light guide plate 10 and the diffuser in the backlight 1 is, the better the blur characteristic becomes. Further, it is also possible to increase the number of patterns of the electrodes (the bottom electrode 32 and the top electrode 36) included in the light modulation element 30 and adjust the voltage of each of the electrodes, so that the state changes monotonously as much as possible between the dark state and the light state.

EXAMPLES

Examples of the present application will be described below. Note that the examples are illustrative, and the present application is not limited to these examples.

[Cell Forming Method]

An electrode pattern having a 10 mm width was formed by a laser ablation method on a glass substrate (125 mm×125 mm) coated with ITO. The resultant was subjected to ultrasound application washing with an alkali cleaning solution, rinsed with ultrapure water, and dried by blowing to form an electrode pattern substrate. A vertical orientation film made of polyimide-based material was then coated on the electrode pattern substrate by a spin coater, and baked at 200° C. to form a vertical orientation film. Then, plastic beads having an average diameter of 7 μm were spread on the electrode pattern substrate on which the orientation film was formed, and a thermoset seal agent was thereafter applied in the periphery. Further, a facing electrode pattern substrate was overlaid and a hardening process was performed to generate empty cells. A solution obtained by preliminarily mixing liquid crystal, ultraviolet curable liquid crystal monomers, and a polymerization initiator to a predetermined composition (hereinbelow, referred to as a monomer mixture liquid crystal) was injected to the empty cells. The monomer mixture liquid crystal was injected while being heated as necessary. The cells in which the monomer mixture liquid crystal was injected were then inserted between cross Nicol polarizers, and an orientation state was visually checked with transmission light. Thereafter, ultraviolet light was emitted to cure the monomer in the liquid crystal. Further, cells for anisotropy evaluation were similarly formed by using a solution obtained by mixing the monomer and the initiator without using the liquid crystal, and existence of retardation and optical axis direction were evaluated by using an ellipsometer.

[Evaluating Method]

(1) Refractive Index

A refractive index of the liquid crystal and that of the monomer were measured by using an Abbe refractometer. A vertical orientation film was applied on the under face of a glass stage and an upper glass block, and the liquid crystal or the monomer was oriented. A polarizer was attached to a cylindrical part of an eyepiece, and an ordinary light refractive index ($n_o$) and an extraordinary light refractive index ($n_e$) were obtained by changing a component of emitted polarized light. A band-pass filter was attached for incident white light, and evaluation was made at 25° C. with an incoming wavelength of 589 nm.

(2) Modulation Ratio

An acrylic light guide plate having a thickness of 10 mm was attached to an upper layer in the thus-formed cell with a matching oil having a refractive index of 1.51, and light of a white LED was irradiated from an edge part. A mirror reflector was placed on the under face of the thus-formed cell via an air layer, and an optical film was placed on the light guide plate. Front luminance in a normal direction of the cell substrate was measured while changing a kind of the optical film and a combination. As a luminance meter, "SR-UL1" available from Topcon Corporation of Japan was used. At this time, a distance was set to 50 cm, and a measurement angle was set to 1°. A value of white luminance/black luminance was determined as a modulation ratio, by defining a case where no voltage is applied to the cell as the black luminance, and defining a case where the voltage is applied as the white luminance. The voltage applied was set to 80V (1 kHz pulse).

(3) Luminance Protrusion

With respect to luminance in three lines each having a 10 mm width which are furthest from an end face on the LED irradiation side in the thus-formed cells, luminance in the case where the voltage is applied to cells in lines other than the three lines was defined as La and luminance in the case where the voltage is not applied to those cells was defined as Lb, and Lb/La was obtained as the luminance protrusion.

Table 1 illustrates combinations of the liquid crystals and the monomers in examples and comparative examples, and evaluation results thereof.

TABLE 1

|  | Liquid Crystal | Monomer | Composition (Liquid Crystal/ Monomer) | Modulation Ratio | |
|---|---|---|---|---|---|
|  |  |  |  | No Film | Diffuser |
| Example 1 | LC-A | M-A | 88:12 | 4.4 | 4.0 |
| Example 2 | LC-B | M-A | 90:10 | 20.8 | 10.2 |
| Example 3 | LC-C | M-A | 90:10 | 25.3 | 10.7 |
| Example 4 | LC-C | M-B | 90:10 | 13.4 | 8.6 |
| Example 5 | LC-A | M-C | 95:5 | 9.2 | 5.3 |
| Comparative Example 1 | — | — | — | 18.0 | 3.0 |
| Comparative Example 2 | LC-A | PN393 | 80:20 | 16.0 | 2.7 |

[Refractive Indices of Materials]

Table 2 illustrates a result of refractive index evaluation of the liquid crystals and the monomers.

TABLE 2

| Material | | Ordinary Light Refractive Index ($n_o$) | Extraordinary Light Refractive Index ($n_e$) |
|---|---|---|---|
| Liquid Crystal | LC-A | 1.482 | 1.585 |
|  | LC-B | 1.495 | 1.647 |
|  | LC-C | 1.496 | 1.656 |
| Monomer | M-A | 1.505 | 1.664 |
|  | M-B | 1.499 | 1.646 |
|  | M-C | 1.550 | 1.682 |

Examples 1 to 5

Cells were formed such that the cells have the combinations of the kinds of the liquid crystal materials and the monomer materials, and the compositions of the materials illustrated in Table 1. The appearance of the cells in all of the examples was transparent when no voltage was applied, and was clouded when the voltage was applied. There was no leakage of light in observation by means of the cross Nicol polarizer in a state where no voltage was applied. The retardation existed in all of the cells for the anisotropy evaluation, and the optical axis direction was the direction normal to the substrate.

Comparative Examples 1 and 2

In comparative example 1, a polymer-dispersed liquid crystal material ("PNM-170") available from DIC Corporation of Japan was used. In comparative example 2, a monomer-mixture liquid crystal obtained by mixing a liquid crystal material and a monomer material (PN393), which are available from Merck Ltd. of Japan, at 80:20 was used. In both of the comparative examples, the orientation film was not used. Other than those, a cell was formed in a manner similar to the examples in each of the comparative examples. The appearance of the formed cell was clouded when no voltage was applied. The appearance when the voltage was applied was transparent in the substrate normal direction, but was clouded in the oblique direction. No retardation was found in the anisotropy evaluation cell.

As for light leakage in the oblique direction (view angle characteristic), the light leakage in the front and oblique directions was small in the black display (when no voltage is applied), and the view angle characteristic was excellent in the examples. On the other hand, in the comparative examples, the light leakage in the oblique direction was larger than that in the front direction in the black display (when the voltage is applied), and the view angle characteristic was bad. In the comparative examples, oblique leak light was large and it was obvious that the view angle characteristic was bad.

FIGS. 14A to 14D illustrate states of leaked light of cells each having a size of 30×40 mm formed in a manner similar to the example 1 and the comparative example 1. It was found that the oblique leak light is small in the example 1, but is large in the comparative example 1. In all of the examples illustrated in Table 1, the modulation ratio was higher than that in the comparative examples in both of the case where there is no optical film and the case where the diffuser having the total light transmittance of 77% is placed. When the luminance protrusion was evaluated in the example 2, the luminance protrusion was 1.5 times in the case where the diffuser having total light transmittance of 77% was placed, and the luminance protrusion was 1.6 times in the case where the diffusion film and the lens sheet were placed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An illuminating device comprising:
   a light guide plate;
   a light source disposed on a side face of the light guide plate; and
   a light modulation element disposed on a surface or on inside of the light guide plate and joined to the light guide plate, the light modulation element having: a pair of transparent substrates disposed apart from each other and opposed to each other; a pair of electrodes provided on surfaces of the pair of transparent substrates; and a light modulation layer provided in a gap between the pair of transparent substrates and including a first region and a second region both having optical anisotropy and having response speeds to an electric field different from each other.

2. The illuminating device according to claim 1, wherein the first region and the second region have a structure in which, when a voltage is not applied across the pair of electrodes, an optical axis of the first region and an optical axis of the second region become parallel to each other, and, when the voltage is applied across the pair of electrodes, the optical axis of the first region and the optical axis of the second region cross each other.

3. The illuminating device according to claim 1, wherein the first region has a structure in which, when a voltage is not applied across the pair of electrodes, an optical axis of the first region is orthogonal to the surfaces of the transparent substrates, and, when the voltage is applied across the pair of electrodes, the optical axis of the first region crosses the surfaces of the transparent substrates at an angle other than 90 degrees or is parallel to the surfaces of the transparent substrates, and the second region has a structure in which an optical axis of the second region is orthogonal to the surfaces of the transparent substrates irrespective of whether or not the voltage is applied across the pair of electrodes.

4. The illuminating device according to claim 1, wherein the light modulation element has a vertical orientation film between the electrodes and the light modulation layer.

5. The illuminating device according to claim 1, wherein the first region includes mainly a liquid crystal material, and the second region is formed by polymerizing an oriented polymerization material by heat or light or by both.

6. The illuminating device according to claim 1, wherein the second region has a streaky structure or a porous structure which does not respond to the electric field, or has a rod structure having a response speed lower than the response speed of the first region.

7. The illuminating device according to claim 1, wherein an ordinary light refractive index of the first region and an ordinary light refractive index of the second region are equal to each other, and an extraordinary light refractive index of the first region and an extraordinary light refractive index of the second region are equal to each other.

8. The illuminating device according to claim 1, wherein the light modulation element has a plurality of the pair of electrodes,
  parts where the electrode provided on one of the transparent substrates and the electrode provided on the other transparent substrate face each other in the light modulation element structure a light modulation cell, and
  the illuminating device includes a drive unit controlling a magnitude of a voltage applied to the pair of electrodes in each of the light modulation cells, so that an optical axis of the first region becomes parallel to an optical axis of the second region in one light modulation cell, and that the optical axis of the first region crosses the optical axis of the second region in another light modulation cell.

9. The illuminating device according to claim 1, wherein at least the electrode on a top face side of the illuminating device in the pair of electrodes is made of a transparent conductive material.

10. The illuminating device according to claim 1, wherein the electrode on a bottom side of the illuminating device in the pair of electrodes is made of a metal.

11. The illuminating device according to claim 1, further comprising a reflector provided on a bottom side of the illuminating device.

12. An illuminating device comprising:
a light guide plate;
a light source disposed on a side face of the light guide plate; and
a light modulation element disposed on a surface or on inside of the light guide plate and joined to the light guide plate, the light modulation element having: a pair of transparent substrates disposed apart from each other and opposed to each other; a pair of electrodes provided on surfaces of the pair of transparent substrates; and a light modulation layer provided in a gap between the pair of transparent substrates, the light modulation layer including a plurality of regions having response speeds to an electric field different from each other, expressing a scattering property to light from the light source when a voltage is applied to the pair of electrodes, and expressing transparency to the light from the light source when the voltage is not applied to the pair of electrodes.

13. A display device comprising:
a display panel having a plurality of pixels disposed in a matrix, which are driven based on an image signal; and
an illuminating device illuminating the display panel,
the illuminating device, in order from a side of the display panel, including:
a light guide plate;
a light source disposed on a side face of the light guide plate; and
a light modulation element disposed on a surface or on inside of the light guide plate and joined to the light guide plate, the light modulation element having: a pair of transparent substrates disposed apart from each other and opposed to each other; a pair of electrodes provided on surfaces of the pair of transparent substrates; and a light modulation layer provided in a gap between the pair of transparent substrates and including a first region and a second region both having optical anisotropy and having response speeds to an electric field different from each other.

14. The display device according to claim 13, wherein the light modulation element has a plurality of the pair of electrodes,
  parts where the electrode provided on one of the transparent substrates and the electrode provided on the other transparent substrate face each other in the light modulation element structure a light modulation cell, and
  the illuminating device includes a drive unit controlling a magnitude of a voltage applied to the pair of electrodes in each of the light modulation cells, so that an optical axis of the first region becomes parallel to an optical axis of the second region in the cell corresponding to a pixel position of black display in the plurality of light modulation cells, and that the optical axis of the first region crosses the optical axis of the second region in the cell corresponding to a pixel position of white display in the plurality of light modulation cells.

* * * * *